United States Patent
Liubich et al.

(10) Patent No.: US 12,541,631 B2
(45) Date of Patent: Feb. 3, 2026

(54) FREE-FORM LAYOUT FEATURE RETARGETING

(71) Applicant: Siemens Industry Software Inc., Plano, TX (US)

(72) Inventors: Vladislav Liubich, West Linn, OR (US); Avneet Kaur, Fremont, CA (US); George P Lippincott, Lake Oswego, OR (US)

(73) Assignee: Siemens Industry Software Inc., Plano, TX (US)

( * ) Notice: Subject to any disclaimer, the term of this patent is extended or adjusted under 35 U.S.C. 154(b) by 658 days.

(21) Appl. No.: 18/064,535

(22) Filed: Dec. 12, 2022

(65) Prior Publication Data
US 2024/0193338 A1    Jun. 13, 2024

(51) Int. Cl.
*G06F 30/392* (2020.01)
*G03F 7/00* (2006.01)

(52) U.S. Cl.
CPC ........ *G06F 30/392* (2020.01); *G03F 7/70441* (2013.01)

(58) Field of Classification Search
CPC ...... G06F 30/39; G06F 30/392; G06F 30/394; G06F 30/398; H10D 89/10; G03D 7/70441; G03F 1/36; G03F 1/70; G03F 1/72
USPC .......................................................... 716/53
See application file for complete search history.

(56) References Cited

U.S. PATENT DOCUMENTS

2023/0237234 A1* 7/2023 Chang .................. G06F 30/392
                                                               716/119
2023/0418260 A1* 12/2023 Yeo ..................... G03F 7/70441

OTHER PUBLICATIONS

Hongbo Zhang et al., "Impact of Lithography Retargeting Process on Low Level Interconnect in 20nm Technology," Proceedings of the International Workshop on System Level Interconnect Prediction, Jun. 2012 pp. 3-10.
Ellyn Yang et al., "Model-based retarget for 45nm node and beyond," Proceedings of SPIE vol. 7274, 727428, 2009.
Kevin Hooker et al., "Curvilinear mask solutions for full-chip EUV lithography," Proceedings of SPIE vol. 12054, 1205407, 2022.

* cited by examiner

*Primary Examiner* — Paul Dinh

(57) ABSTRACT

Various aspects of the present disclosed technology relate to techniques for retargeting free-form layout features. In a retargeting process, anchor points are selected on boundary lines of layout features based on one or more predetermined conditions. Property values comprising spacing values and linewidth values for each of the anchor points are then determined. Based on the determined property values, positions of the anchor points are adjusted to derive new anchor points. Retargeted layout features are derived by using splines as interpolating curves passing through the new anchor points or as approximating curves passing near to but not necessarily through the new anchor points.

20 Claims, 7 Drawing Sheets

FREE-FORM LAYOUT FEATURE RETARGETING

FIELD OF THE DISCLOSED TECHNOLOGY

The present disclosed technology relates to the field of circuit design and manufacture. Various implementations of the disclosed technology may be particularly useful for retargeting layout designs containing curvilinear features.

BACKGROUND OF THE DISCLOSED TECHNOLOGY

As designers and manufacturers continue to shrink the size of circuit components, the shapes reproduced on the substrate through photolithography become smaller and are placed closer together. This reduction in feature size and spacing increases the difficulty of faithfully reproducing the image onto the substrate intended by the design layout and can create flaws in the manufactured device. To address the problem, one or more resolution enhancement techniques are often employed to improve the resolution of the image that the mask forms on the substrate during the photolithographic process.

One of resolution enhancement techniques, "optical proximity correction" or "optical process correction" (OPC), tries to compensate for light diffraction effects. When light illuminates the photomask, the transmitted light diffracts. The higher spatial frequencies the regions of the mask have, the higher angles the light diffracts at. The resolution limits of the lens in a photolithographic system make the lens act effectively as a low-pass filter for the various spatial frequencies in the two-dimensional layout. This can lead to optical proximity effects such as a pull-back of line-ends from their desired position, corner rounding and a bias between isolated and dense structures. To correct optical proximity effects, the amplitude of the light transmitted through a lithographic mask is adjusted by modifying the layout design data employed to create the photomask. For example, edges in the layout design may be adjusted to make certain portions of the geometric elements larger or smaller, in accordance with how much additional light exposure (or lack of exposure) is desired at certain points on the substrate. When these adjustments are appropriately calibrated, overall pattern fidelity is greatly improved.

Optical proximity correction alone, however, cannot address some process window-related issues. A post-design modification of layout features usually performed prior to optical proximity correction becomes necessary. The process for better tolerating process variation is usually referred to as retargeting. In this process, the original layout features are changed and the modified layout features serve as the intended target for optical proximity correction. Sometimes, retargeting may also be performed after optical proximity correction.

Layout designs typically contain mainly Manhattan shapes. Edges of Manhattan shapes are parallel to the x and y axes. Conventional design rule checking (DRC), retargeting, and OPC tools are tuned to process Manhattan shapes. Silicon photonics, combining large-scale photonic integration with large-scale electronic integration, can impact many areas such as telecommunications, data centers and high-performance computing. Silicon photonics designs, however, are often drawn with curved shapes. Curvilinear patterns also could offer better lithographic quality than Manhattan patterns. Memory chip making has started to explore curvilinear patterns. Due to the practical needs and advantages for using curvilinear patterns, the mask making industry has made progress with the introduction of multi-beam mask writers for writing curvilinear patterns on a mask. It is thus desirable to develop new retargeting techniques to better process curvilinear shapes.

BRIEF SUMMARY OF THE DISCLOSED TECHNOLOGY

Various aspects of the present disclosed technology relate to techniques for retargeting free-form layout features. In one aspect, there is a method comprising: selecting anchor points on boundary lines of layout features based on one or more predetermined conditions; determining property values for each of the anchor points, the property values comprising spacing values and linewidth values; adjusting positions of the anchor points based on the determined property values to derive new anchor points; and deriving retargeted layout features by using splines as interpolating curves passing through the new anchor points or as approximating curves passing near to but not necessarily through the new anchor points.

The method may further comprise: performing optical proximity correction on the retargeted layout features to generate modified layout features; and processing the modified layout features to generate mask data for a mask-writing tool to make photomasks.

The one or more predetermined conditions may comprise a condition based on user specification, a curvature-related condition, a neighboring feature-related condition, or any combination thereof.

The determining may comprise: creating a cutline for each of the anchor points. The creating may comprise: using splines as interpolating curves passing through some or all of the anchor points.

The adjusting may comprise: searching for adjustment values in a look-up table.

The splines may be Bezier splines. The deriving may comprise: adding two control points for each of the anchor points, wherein the adding comprises: identifying two anchor points neighboring the each of the anchor points; creating a line segment centered at the each of the anchor points and parallel to a line passing through the two anchor points neighboring the each of the anchor points; and placing the two control points at vertices of the created line segment.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages

DETAILED DESCRIPTION OF THE DISCLOSED TECHNOLOGY

General Considerations

Figure 1:
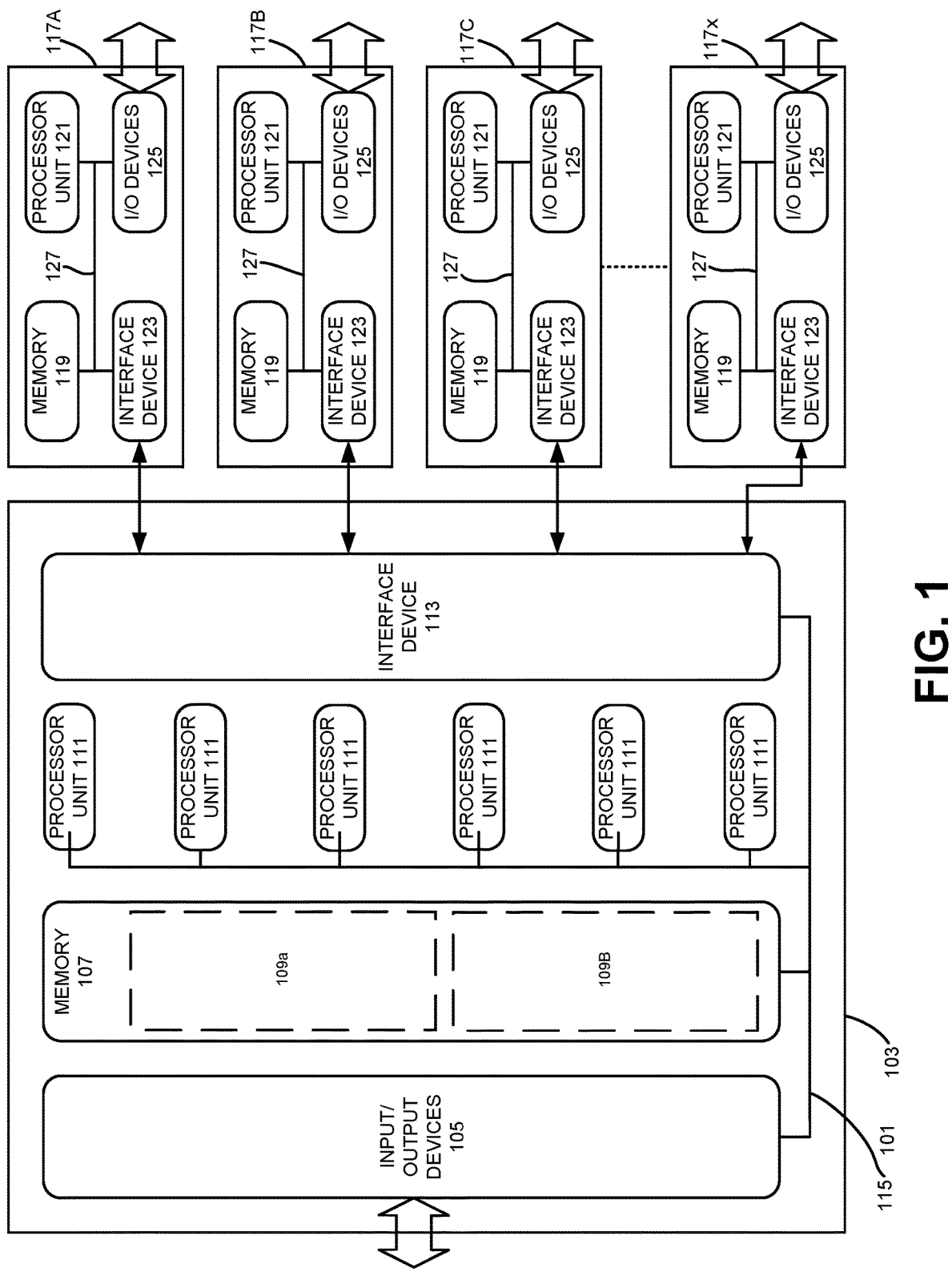
FIG. 1 illustrates an example of a computing system that may be used to implement various embodiments of the disclosed technology.

Various aspects of the present disclosed technology relate to techniques for retargeting free-form layout features. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "select", "determine", "derive", and "adjust" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
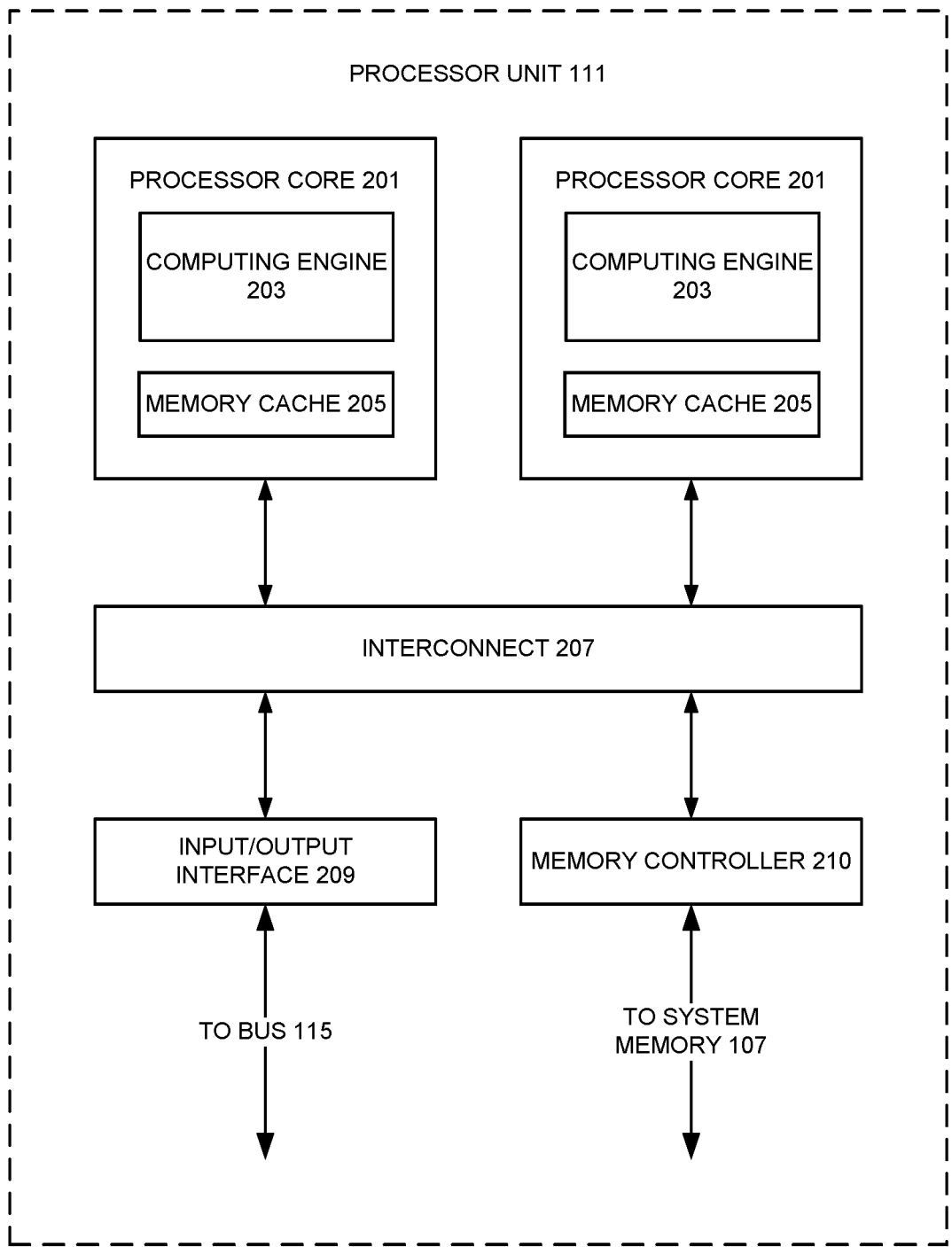
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, California, the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Circuit Design Flow And Retargeting

Electronic circuits such as integrated microcircuits are used in a variety of products, enabling advances in communications, computing, healthcare, military systems, transportation, and many other applications. Designing and fabricating integrated circuit devices typically involves a series of steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Automated place and route tools will be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics Corporation, and the more recent Open Artwork System Interchange Standard (OASIS) proposed by Semiconductor Equipment and Materials International (SEMI). These various industry formats are used to define the geometrical information in IC layout designs that are employed to manufacture integrated circuits.

Before a layout design can be used by fabrication tools to manufacture the device using a photolithographic process, a designer will perform a number of verification processes. For example, the layout design may be analyzed to confirm that it accurately represents the circuit devices and their relationships described in the device design. In this process, a LVS (layout versus schematic) tool will extract a netlist from the layout design and compare it with the netlist taken from the circuit schematic. LVS can be augmented by formal equivalence checking, which checks whether two circuits perform exactly the same function without demanding isomorphism.

Process variations and technical limitations of the lithography techniques can make it difficult or even impossible to print some layout features. To achieve a high overall yield and reliability for the design, the layout design will also be analyzed to confirm that it complies with various design requirements, such as minimum spacings between geometric elements and minimum linewidths of geometric elements. A DRC (design rule checking) tool typically performs this verification process based on a set of rules specific to the semiconductor process chosen for fabrication. The set of rules is often referred to as a rule deck or just a deck. An example format of a rule deck is the Standard Verification Rule Format (SVRF) by Mentor Graphics Corporation (now Siemens EDA).

Still further, the layout design may be modified to counteract limitations in the manufacturing process, etc. As mentioned previously, one or more resolution enhancement techniques (RETs) are often employed to improve the resolution of the image that the mask forms on the substrate during the photolithographic process. One of these techniques is optical proximity correction (OPC). For complex layout features, model-based OPC approaches need to be employed to obtain desired results. In a typical model-based OPC process, edges of polygons in the layout design are divided into edge fragments to allow the desired fine motion of edge fragments. Model-based OPC then performs simulation to predict the printed image. The distances between the target image and the simulated image are referred to as edge placement error (EPE). Based on edge placement errors, the edge fragments are individually moved or adjusted. The image that would be produced by a mask using the displaced edge fragments is simulated, and the new simulated image is compared with the target image, and the edge placement error for each edge fragment is again computed. This process of moving the edge fragments, simulating the image that would be produced using the moved edge fragments, and comparing the simulated image to the target image may be repeated for a number of times to ensure the simulated image for the resulting mask to reproduce the target image as much as possible. Each cycle of moving edge fragments and comparing the new simulated image to target image is referred to as an iteration of the OPC process.

Also as mentioned previously, the target image for OPC often needs to be retargeted before the OPC process to address process window-related concerns. An OPC process may computes the optimal mask layouts using the nominal process condition such as nominal focus and exposure dosage. This may put the post-OPC layout at non-negligible patterning risk due to the inevitable process variation (focus and dose variations). With a little sacrifice at the nominal condition, process window-aware OPC can enhance the robustness of post-OPC layout patterning in the presence of process variation by changing the original layout target slightly. But it can only bring very insufficient improvement to the process window of the original layout because OPC is designed to meet the original layout target, which may not be so optimal for the process window. It is therefore important to apply some form of target correction such as width/space dependent biasing prior to optical proximity correction. Such operations can ease the restrictions on technology ground rules and OPC by converting design-rule-clean but hard-to-print design shapes into lithographically robust target shapes. The process of converting design shapes provided by designers into target shapes for lithography is referred to as retargeting.

Retargeting may be applied either by using a set of pre-characterized rules or by a model-based process which relies on real time lithographic simulations to determine retarget values. A typical rule-based retargeting flow can modify target layout shapes for an integrated circuit device design manufacturing process based on a look-up table. The look-up table can comprise, for example, the retargeting bias values for each width and space combination obtained by exhaustively simulating various width and space combinations for wires using existing lithographic models. Additionally or alternatively, the retargeting bias values can be obtained based on empirical data. The model-based retargeting, on the other hand, determines retargeting values from lithographic simulations performed during the retargeting process.

Figure 3:
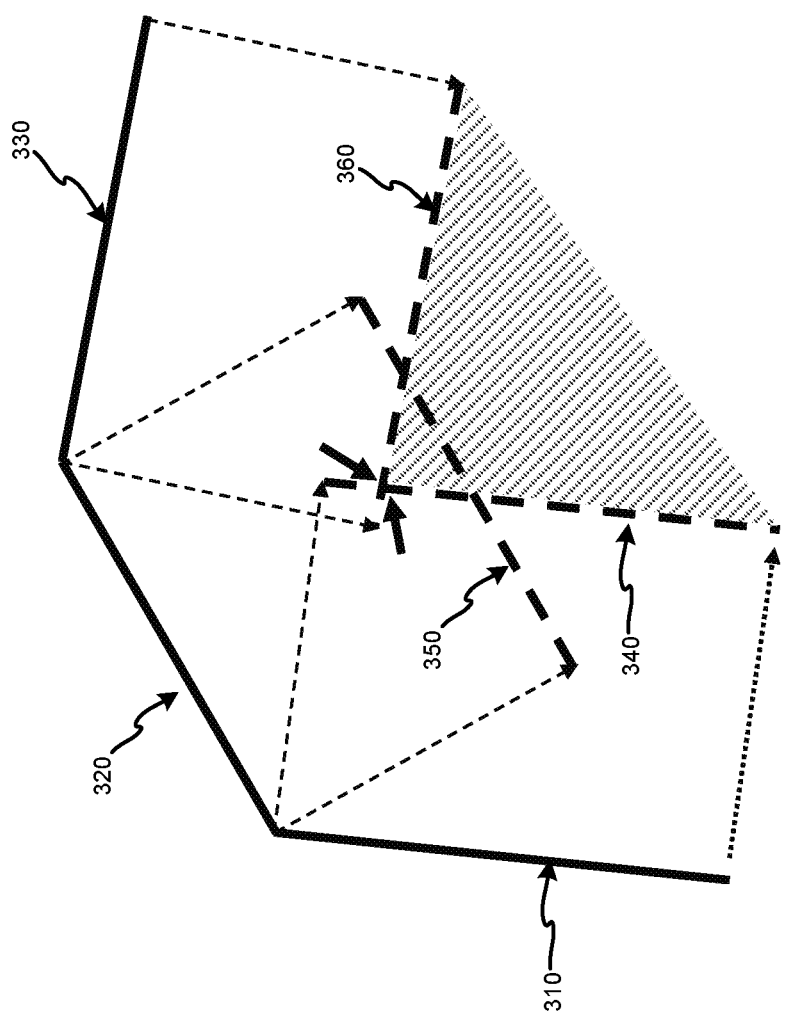
FIG. 3 illustrates an example of fragment degeneration caused by a conventional retargeting technique that uses short edges with arbitrary angles to represent boundary lines of curvilinear layout features.

Conventional retargeting techniques are developed to process mainly Manhattan shapes. Applying them to curvilinear features can lead to problems. FIG. 3 illustrates an example of fragment degeneration caused by a conventional retargeting technique that uses short edges with arbitrary angles to represent boundary lines of curvilinear layout features. In the figure, three edges 310, 320 and 330 are used to represent a boundary line of a curvilinear feature. In a retargeting operation, the three edges 310, 320 and 330 are supposed to move to the new target locations 340, 350 and 360, respectively. However, the new edges 340 and 360 intersect, leaving no space for the new edge 350. While a solution may be developed for this particular problem, it is challenging to discover a general approach to handle various curvilinear cases.

Once a layout design is finalized, fabrication tools will use it to make masks and use the masks to manufacture a circuit through a photolithographic process. There are many different fabrication processes for manufacturing a circuit, but most processes include a series of steps that deposit layers of different materials on a substrate, expose specific portions of each layer to radiation, and then etch the exposed (or non-exposed) portions of the layer away. Each time that a layer of material is exposed to radiation, a mask allows only the desired areas to be exposed to the radiation, and protects the other areas from exposure. The process of depositing layers of material, and then exposing specific patterns to radiation, etching, and adding dopants or other diffusion materials, is repeated a number of times, allowing the different physical layers of the circuit to be manufactured.

Retargeting Tool

Figure 4:
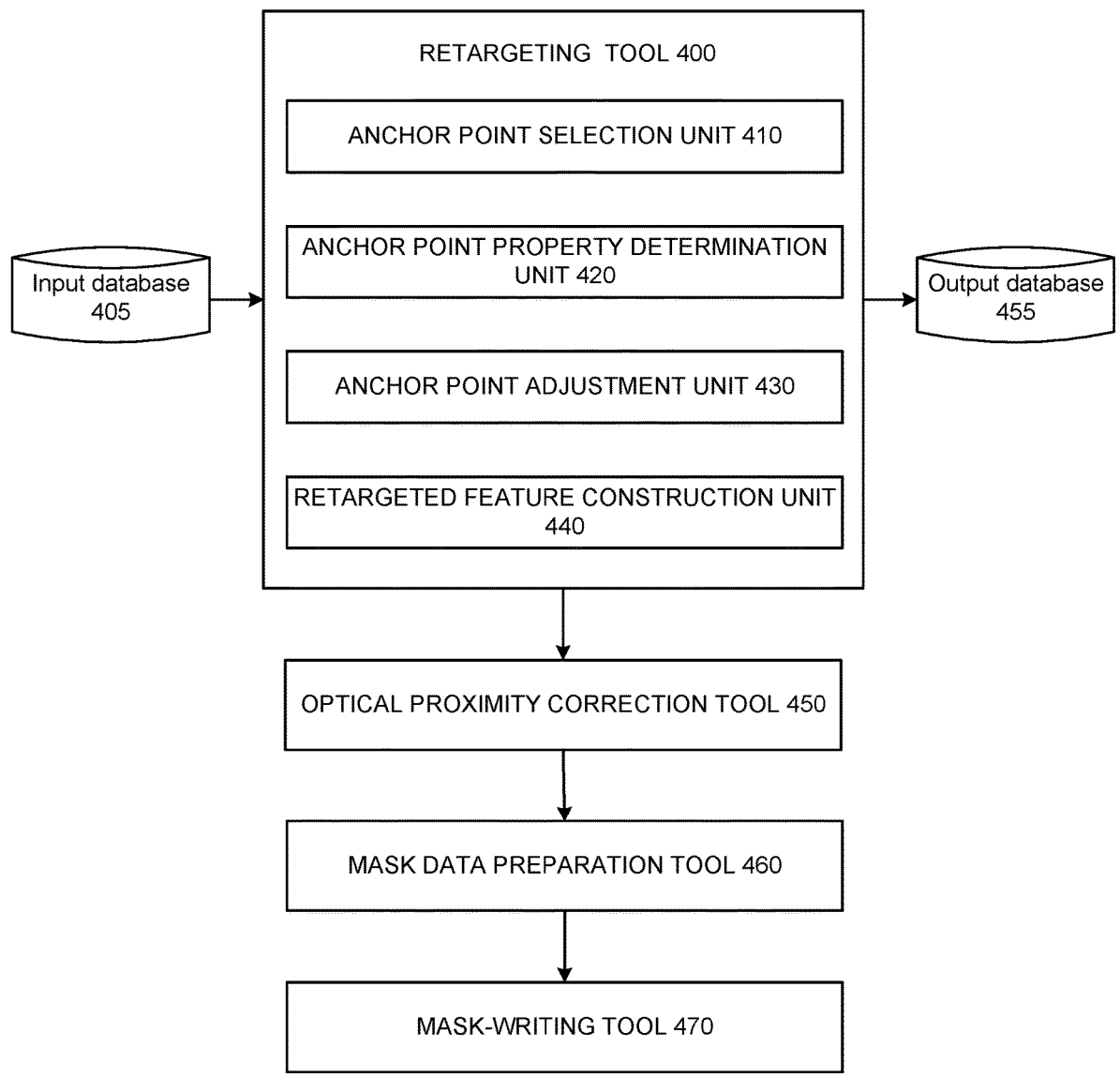
FIG. 4 illustrates an example of a retargeting tool that may be implemented according to various embodiments of the disclosed technology.

FIG. 4 illustrates an example of a retargeting tool 400 that may be implemented according to various embodiments of the disclosed technology. The retargeting tool 400 can be employed to perform a retargeting process on a full-chip layout design having curvilinear patterns. As seen in this figure, the retargeting tool 400 includes an anchor point selection unit 410, an anchor point property determination unit 420, an anchor point adjustment unit 430, and a retargeted feature construction unit 440. Some implementations of the retargeting tool 400 may cooperate with (or incorporate) one or more of an optical proximity correction tool 450, a mask data preparation tool 460, a mask-writing tool 470, an input database 405 and an output database 455.

As will be discussed in more detail below, the retargeting tool 400 can receive a layout design from the input database 405. The anchor point selection unit 410 can select anchor points on boundary lines of layout features in the layout design based on one or more predetermined conditions. The anchor point property determination unit 420 can determine property values for each of the anchor points. The property values comprise spacing values and linewidth values. The anchor point adjustment unit 430 can adjust positions of the anchor points based on the determined property values to derive new anchor points. The retargeted feature construction unit 440 can derive retargeted layout features by using splines as interpolating curves passing through the new anchor points or as approximating curves passing near to but not necessarily through the new anchor points. The retargeting tool 400 can store the retargeted layout design into the output database 455. Optionally, the optical proximity correction tool 450 can perform an optical proximity correction process on the retargeted layout features to generated modified layout features. The mask data preparation tool 460 optionally can process the modified layout features to generate mask data. The mask-writing tool 470 can use the mask data to create photomasks.

As previously noted, various examples of the disclosed technology may be implemented by one or more computing systems, such as the computing system illustrated in FIGS. 1 and 2. Accordingly, one or more of the anchor point selection unit 410, the anchor point property determination unit 420, the anchor point adjustment unit 430, the retargeted feature construction unit 440, the optical proximity correction tool 450, and the mask data preparation tool 460 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the anchor point selection unit 410, the anchor point property determination unit 420, the anchor point adjustment unit 430, the retargeted feature construction unit 440, the optical proximity correction tool 450, and the mask data preparation tool 460. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the anchor point selection unit 410, the anchor point property determination unit 420, the anchor point adjustment unit 430, the retargeted feature construction unit 440, the optical proximity correction tool 450, and the mask data preparation tool 460 are shown as separate units in FIG. 4, a single computer (or a single processor within a master computer) or a single computer system may be used to implement some or all of these units at different times, or components of these units at different times.

With various examples of the disclosed technology, the input database 405 and the output database 455 may be implemented using any suitable computer readable storage device. That is, either of the input database 405 and the output database 455 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 405 and the output database 455 are shown as separate units in FIG. 4, a single data storage medium may be used to implement some or all of these databases.

Process of Free-Form Layout Feature Retargeting

Figure 5:
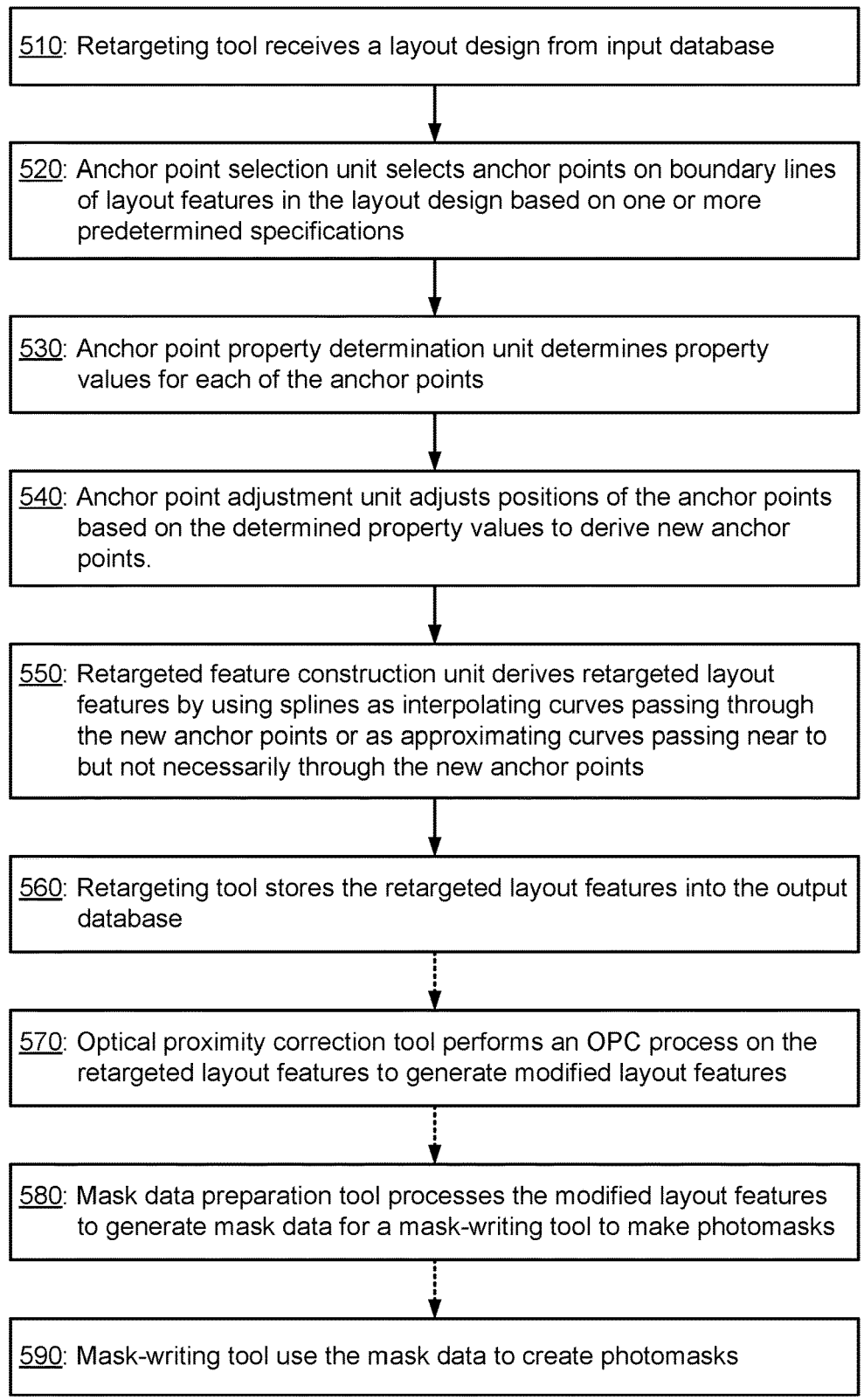
FIG. 5 illustrates a flowchart showing a process of layout feature retargeting that may be implemented according to various examples of the disclosed technology.

FIG. 5 illustrates a flowchart 500 showing a process of layout feature retargeting that may be implemented according to various examples of the disclosed technology. For ease of understanding, methods of layout feature retargeting that may be employed according to various embodiments of the disclosed technology will be described with reference to the retargeting tool 400 in FIG. 4 and the flow chart 500 illustrated in FIG. 5. It should be appreciated, however, that alternate implementations of a retargeting tool may be used to perform the methods of layout feature retargeting illustrated by the flow chart 500 according to various embodiments of the disclosed technology. Likewise, the retargeting tool 400 may be employed to perform other methods of layout feature retargeting according to various embodiments of the disclosed technology.

Figure 6:
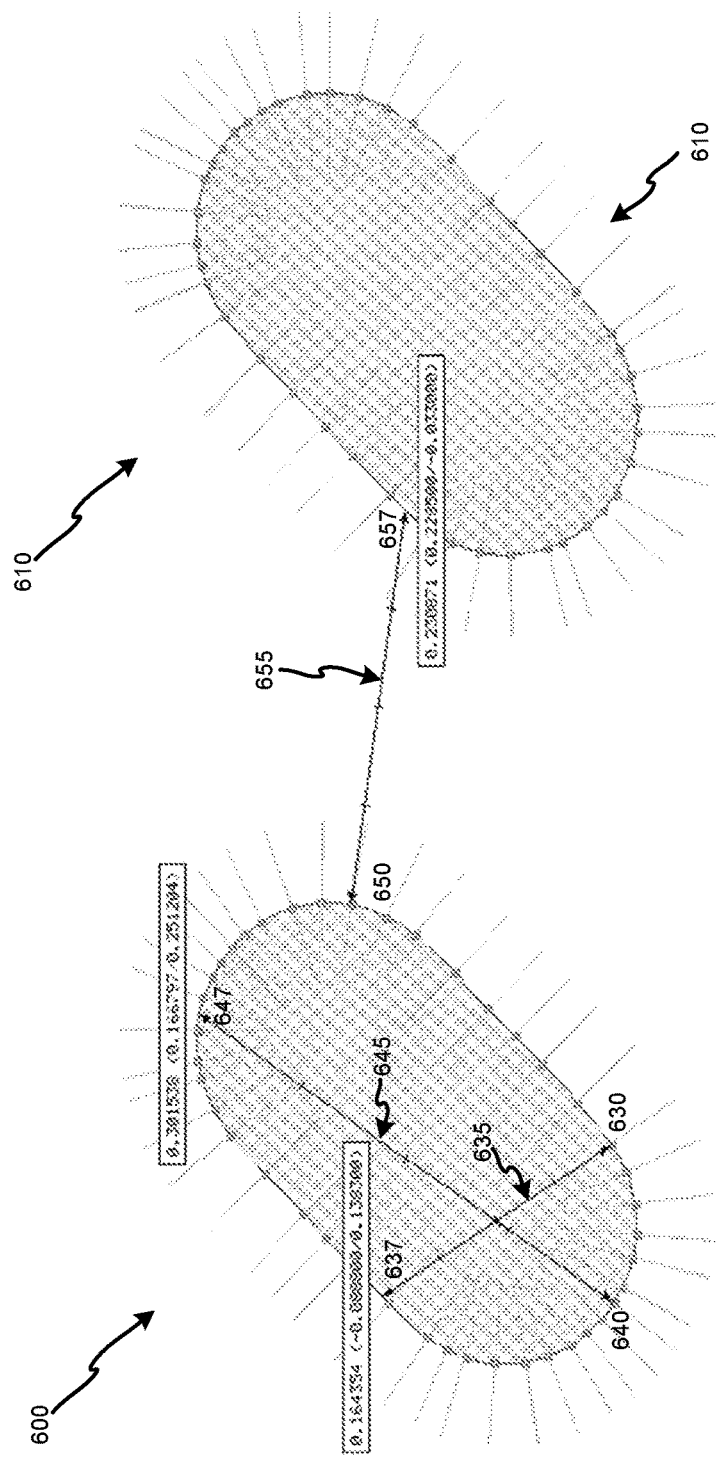
FIG. 6 illustrates two example curvilinear layout features with anchor points and cutlines.

In operation 510 of the flow chart 500, the retargeting tool 400 receives a layout design from the input database 405. The layout design, derived from a circuit design, may be in the GDSII standard format or the OASIS format. The layout design can be one for a whole chip or a portion of a full-chip layout design. The layout design comprises layout features having curved boundary lines or line segments. The layout design may be the original layout design that has been verified by various physical verification tools such as a DRC tool. The layout design may be one that has been processed by preliminary optical proximity correction. FIG. 6 illustrates two example curvilinear layout features 600 and 610. Each of the layout feature 600 and 610 comprises straight boundary line segments and curved boundary line segments.

In operation 520 of the flow chart 500 shown in FIG. 5, the anchor point selection unit 410 selects anchor points on boundary lines of layout features in the layout design based on one or more predetermined conditions. Anchor points are typically located where measurements or classifications are expected to perform. The one or more predetermined conditions can comprise conditions specified by users. The layout design may contain a marker layer. Users can place markers in locations where printing errors should be particularly avoided, for example. The anchor point selection unit 410 can determine whether a marker in the marker layer is within a certain distance from a boundary line of a layout feature. If the answer is yes, an anchor point can be placed on the point of the boundary line that is closest to the marker. Another predetermined condition can be based on curvature. When the curvature of a boundary line segment is not zero, anchor points may be placed densely compared to straight boundary line segments. The larger the curvature, the more the anchor points. To ensure smooth transitions from dense regions to isolated regions, straight boundary line segments near curve boundary line segment can have more anchor points than those that are far away. Still another predetermined condition can be that anchor points should be dense in a location where two layout features are near each other and one or both have projecting corners.

In operation 530, the anchor point property determination unit 420 determines property values for each of the anchor points. The property values can comprise spacing values and linewidth values. To determine spacing and linewidth values, the anchor point property determination unit 420 can create a cutline passing through each of the anchor points. A cutline is a line that is perpendicular to the tangent of the boundary line segment. Using the cutline, the anchor point property determination unit 420 can measure spacing and/or linewidth values for each of the anchor points. In FIG. 6, cutlines 635, 645 and 655 are drawn for anchor points 630, 640 and 650 on the layout feature 600, respectively. The cutline 635 intersects the boundary line of the layout feature 600 at a point 637 and the cutline 645 intersects the boundary line of the layout feature 600 at a points 647. The anchor point property determination unit 420 can derive the length values between the points 630 and 637 and between the points 640 and 647 as the linewidth values for the anchor points 630 and 640, respectively. The cutline 655 intersects the boundary line of the layout feature 610 at points 657. The anchor point property determination unit 420 can derive the length value between the points 650 and 657 as the spacing value for the anchor point 650.

Some layout features may have portions of boundary lines formed by irregular line segments like jogs. Cutlines drawn for anchor points on these irregular line segments can lead to incorrect spacing values or linewidth values. The anchor point property determination unit 420 may first use splines to replace the irregular line segments similar to operation 550 discussed in detail below and then use the curve line segments to derive cutlines.

Alternatively or additionally, the anchor point property determination unit 420 may create a cone originated from each of the anchor points to help determine spacing values and linewidth values. In FIG. 8, a cone 665 is created for the anchor point 660. The distance between the anchor point 660 and a point 667 can serve as the spacing value for the anchor point 660.

Referring back to FIG. 5, in operation 540, the anchor point adjustment unit 430 adjusts positions of the anchor points based on the determined property values to derive new anchor points. The anchor point adjustment unit 430 can use the determined property values to search for corresponding adjustment values in a look-up table. The look-up table can comprise, for example, the retargeting bias values for each width and space combination. These retargeting bias values can be determined by exhaustively simulating various width and space combinations for wires using existing lithographic models. Additionally or alternatively, the retargeting bias values can be obtained based on empirical data. When a particular width or particular space is located in the table, the anchor point adjustment unit 430 can move the anchor point along the cutline for the retargeting bias value.

In operation 550, the retargeted feature construction unit 440 derives retargeted layout features by using splines as interpolating curves passing through the new anchor points or as approximating curves passing near to but not necessarily through the new anchor points. The splines can be constructed using piecewise polynomials: each of the curve segments between two of the new anchor points is represented by a polynomial with a particular set of parameters. These curve segments satisfy certain continuity conditions. The first order continuity requires that the curve segments going through the new anchor points. The second-order continuity requires that the curve segments have the same slope when they join together. The third-order continuity requires that the curve segments between the new anchor points have the same curvature when they join together. The retargeted feature construction unit 440 can choose to have a continuity up to a certain order.

Figure 7:
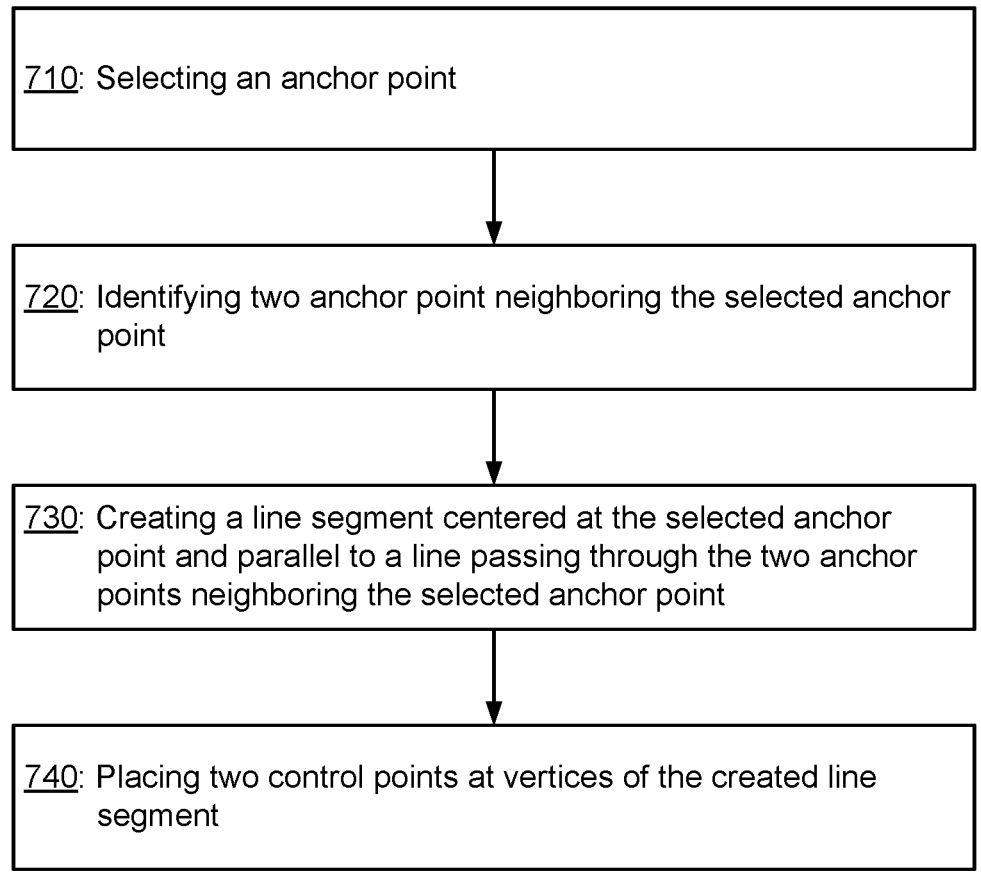
FIG. 7 illustrates a flow chart showing a process of control point placement that may be implemented according to various examples of the disclosed technology.

According to some embodiments of the disclosed technology, the retargeted feature construction unit 440 may use Bezier splines to derive retargeted layout features. For example, cubic Bezier curves may be used as interpolating curves between the new anchor points. To construct a cubic Bezier curve segment between two neighboring new anchor points, two control points need to be added for each of the new anchor points. FIG. 7 illustrates a flow chart 700 showing a process of control point placement that may be implemented according to various examples of the disclosed technology. In operation 710, an anchor point is selected. In operation 720, two anchor points neighboring the selected anchor point are identified. In operation 730, a line segment centered at the selected anchor point and parallel to a line passing through the two anchor points neighboring the selected anchor point is created. The length of the line segment can be specified by users as a fraction of the line segment connecting the two anchor points neighboring the selected anchor point. The smaller the ratio, the shorter the segment, the closer the resulting curve to a straight line connecting two neighboring anchor points. In operation 740, two control points are placed at vertices of the line segment centered at the selected anchor point.

Referring back to FIG. 5, in operation 560, the retargeting tool 400 stores the retargeted layout features into the output database 455.

In operation 570, the optical proximity correction tool 450 optionally can perform an optical proximity correction process on the retargeted layout features to generate modified layout features. The optical proximity correction tool 450 can modify the retargeted layout features to enable the simulated image for the resulting mask to reproduce the retargeted image as much as possible. The process may involve dividing boundary lines of the retargeted layout features into fragments to allow the desired fine adjustment based on distances between the retarget image and the simulated image. As discussed previously, the process is iterative in nature.

While OPC based on modifying geometric shapes can certainly correct many proximity effects, it does not address one proximity effect—the iso-dense bias problem caused by variations in focus condition. The variations in focus condition become significant when an off-axis illumination scheme (one of the three major resolution enhancement technologies) is optimized for greatest depth of focus of densely placed features. To correct this proximity effect, the optical proximity correction tool 450 can insert sub-resolution assist features (SRAFs) into the layout design to provide a dense-like environment for isolated features.

Alternatively, the optical proximity correction tool 450 may use inverse lithography technology. Inverse lithography technology computes an optimized mask that produces the desired wafer target with best pattern fidelity and/or largest process window in a specific lithographic process. The specific lithographic process can be represented by a transformation function which transforms mask patterns into desired wafer patterns. The transformation function can account for not only optics of the particular photolithography equipment and electromagnetics of the three-dimensional (3D) mask pattern, but also behavior of the photoresist in the light exposure, resist development and etching processes. Sub-resolution assist features can be automatically generated in such an inverse lithography process.

In operation 580, the mask data preparation tool 460 optionally can process the modified layout features to generate mask data for a mask-writing tool to make photomasks. The mask-writing tool can be raster scan-based—either electron beams or laser beams constantly scan in a predetermined pattern. In this approach, the mask data preparation tool 460 converts the layout data into primitive shapes, which is sometimes referred to as mask data fracturing. Alternatively, the mask-writing tool can use a variable-shaped beam—a larger beam is shaped by an aperture into a primitive shape, and the image of the aperture is projected in individual "flashes" at appropriate locations. For this approach, the mask data preparation tool 460 fractures the layout design into shots of acceptable size and the appropriate stage motion instructions for creating the pattern. Additionally, the mask data preparation tool 460 may perform mask process correction (MPC). Although the photomask features are typically used in a 4× reduction system, and the feature dimensions are thus 4× larger than on the wafer, there is still need to accurately fabricate SRAF and other OPC jogs and structures that are significantly smaller. Mask process correction attempts to correct charged particle proximity effects.

In operation 590, the mask-writing tool 470 uses the mask data to create photomasks. The photomasks can be used to fabricate chips through photolithography.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, executed by at least one processor of a computer, comprising:
   selecting anchor points on boundary lines of layout features based on one or more predetermined conditions;
   determining property values for each of the anchor points, the property values comprising spacing values and linewidth values;
   adjusting positions of the anchor points based on the determined property values to derive new anchor points; and
   deriving retargeted layout features by using splines as interpolating curves passing through the new anchor points or as approximating curves passing near to but not necessarily through the new anchor points.

2. The method recited in claim 1, further comprising:
   performing optical proximity correction on the retargeted layout features to generate modified layout features; and
   processing the modified layout features to generate mask data for a mask-writing tool to make photomasks.

3. The method recited in claim 1, wherein the one or more predetermined conditions comprise a condition based on user specification, a curvature-related condition, a neighboring feature-related condition, or any combination thereof.

4. The method recited in claim 1, wherein the determining comprises:
   creating a cutline for each of the anchor points.

5. The method recited in claim 4, wherein the creating comprises:
   using splines as interpolating curves passing through some or all of the anchor points.

6. The method recited in claim 1, wherein the adjusting comprises:
   searching for adjustment values in a look-up table.

7. The method recited in claim 1, wherein the splines are Bezier splines.

8. The method recited in claim 7, wherein the deriving comprises:
   adding two control points for each of the anchor points, wherein the adding comprises:
      identifying two anchor points neighboring the each of the anchor points;
      creating a line segment centered at the each of the anchor points and parallel to a line passing through the two anchor points neighboring the each of the anchor points; and
      placing the two control points at vertices of the created line segment.

9. One or more non-transitory computer-readable media storing computer-executable instructions for causing one or more processors to perform a method, the method comprising:
   selecting anchor points on boundary lines of layout features based on one or more predetermined conditions;
   determining property values for each of the anchor points, the property values comprising spacing values and linewidth values;
   adjusting positions of the anchor points based on the determined property values to derive new anchor points; and
   deriving retargeted layout features by using splines as interpolating curves passing through the new anchor points or as approximating curves passing near to but not necessarily through the new anchor points.

10. The one or more non-transitory computer-readable media recited in claim 9, wherein the method further comprises:
    performing optical proximity correction on the retargeted layout features to generate modified layout features; and
    processing the modified layout features to generate mask data for a mask-writing tool to make photomasks.

11. The one or more non-transitory computer-readable media recited in claim 9, wherein the one or more predetermined conditions comprise a condition based on user specification, a curvature-related condition, a neighboring feature-related condition, or any combination thereof.

12. The one or more non-transitory computer-readable media recited in claim 9, wherein the determining comprises:
    creating a cutline for each of the anchor points.

13. The one or more non-transitory computer-readable media recited in claim 12, wherein the creating comprises:
    using splines as interpolating curves passing through some or all of the anchor points.

14. The one or more non-transitory computer-readable media recited in claim 9, wherein the adjusting comprises:
    searching for adjustment values in a look-up table.

15. The one or more non-transitory computer-readable media recited in claim 9, wherein the splines are Bezier splines.

16. The one or more non-transitory computer-readable media recited in claim 15, wherein the deriving comprises:
    adding two control points for each of the anchor points, wherein the adding comprises:
       identifying two anchor points neighboring the each of the anchor points;
       creating a line segment centered at the each of the anchor points and parallel to a line passing through the two anchor points neighboring the each of the anchor points; and
    placing the two control points at vertices of the created line segment.

17. A system, comprising:
    one or more processors, the one or more processors programmed to perform a method, the method comprising:
    selecting anchor points on boundary lines of layout features based on one or more predetermined conditions;
    determining property values for each of the anchor points, the property values comprising spacing values and linewidth values;
    adjusting positions of the anchor points based on the determined property values to derive new anchor points; and
    deriving retargeted layout features by using splines as interpolating curves passing through the new anchor points or as approximating curves passing near to but not necessarily through the new anchor points.

18. The system recited in claim 17, wherein the one or more predetermined conditions comprise a condition based on user specification, a curvature-related condition, a neighboring feature-related condition, or any combination thereof.

19. The system recited in claim 17, wherein the determining comprises:

creating a cutline for each of the anchor points.

20. The system recited in claim 17, wherein the splines are Bezier splines.

\* \* \* \* \*